(12) United States Patent
Housman

(10) Patent No.: US 7,795,820 B2
(45) Date of Patent: Sep. 14, 2010

(54) EMULATION CIRCUIT

(75) Inventor: David Vernon Housman, London (GB)

(73) Assignee: Lights and Signals Limited, Rickmansworth (GB)

( * ) Notice: Subject to any disclaimer, the term of this patent is extended or adjusted under 35 U.S.C. 154(b) by 270 days.

(21) Appl. No.: 12/064,608

(22) PCT Filed: Aug. 1, 2006

(86) PCT No.: PCT/GB2006/050230

§ 371 (c)(1),
(2), (4) Date: May 13, 2008

(87) PCT Pub. No.: WO2007/023309

PCT Pub. Date: Mar. 1, 2007

(65) Prior Publication Data

US 2008/0218097 A1    Sep. 11, 2008

(30) Foreign Application Priority Data

Aug. 25, 2005    (GB) ................................. 0517331.5

(51) Int. Cl.
*H05B 41/16* (2006.01)
(52) U.S. Cl. .................. 315/247; 315/224; 315/291
(58) Field of Classification Search ................ 315/203, 315/205, 224, 247, 272, 291, 307; 323/212, 323/235, 237, 277, 312; 363/21.01, 21.03, 363/21.06
See application file for complete search history.

(56) References Cited

U.S. PATENT DOCUMENTS

| 6,118,259 | A | 9/2000 | Bucks et al. | |
|---|---|---|---|---|
| 7,218,533 | B2 * | 5/2007 | Radecker et al. | 363/21.02 |
| 7,385,360 | B2 * | 6/2008 | Dluzniak | 315/307 |
| 7,459,864 | B2 * | 12/2008 | Lys | 315/291 |
| 2003/0107332 | A1 * | 6/2003 | Newman et al. | 315/307 |
| 2008/0012502 | A1 * | 1/2008 | Lys | 315/247 |
| 2008/0018268 | A1 * | 1/2008 | Green | 315/308 |

FOREIGN PATENT DOCUMENTS

| DE | 10215472 | 11/2003 |
|---|---|---|
| DE | 10359196 | 7/2005 |
| DE | 10107578 | 2/2008 |
| EP | 1233654 | 8/2002 |
| GB | 2371689 | 7/2002 |
| GB | 2417788 | 3/2006 |
| WO | 9956504 | 11/1999 |

* cited by examiner

*Primary Examiner*—Douglas W Owens
*Assistant Examiner*—Tung X Le
(74) *Attorney, Agent, or Firm*—Chernoff, Vilhauer, McClung & Stenzel

(57) ABSTRACT

An emulation circuit is disclosed for connection to a low energy lamp energized by an AC supply and substituted for an incandescent lamp in a traffic signal installation. The circuit comprises means for sensing the magnitude of a supply voltage applied to energize the lamp connected to the terminals and means for sensing correct operation of the lamp. When the lamp is sensed to be operating correctly an auxiliary load intermittently to draw an additional current through the auxiliary load from the AC supply. The additional current is drawn only between preset phase angles of the cycles of the AC supply and the magnitude of the additional current drawn by the auxiliary load is varied in dependence upon the sensed magnitude of the supply voltage.

8 Claims, 1 Drawing Sheet

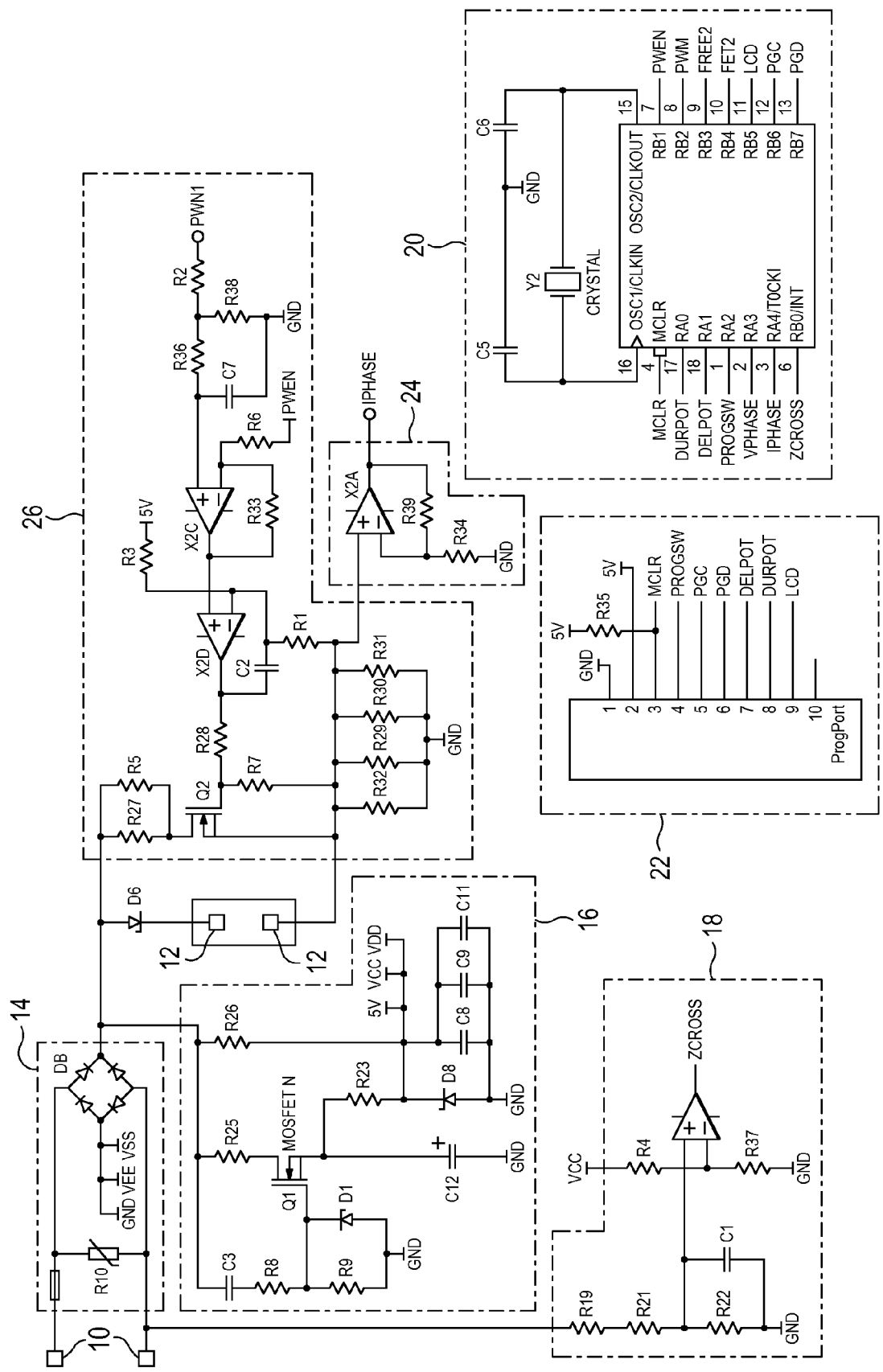

EMULATION CIRCUIT

This is a national stage application filed under 35 USC 371 based on International Application No. PCT/GB2006/050230 filed Aug. 1, 2006, and claims priority under 35 USC 119 of United Kingdom Patent Application No. 0517331.5 filed Aug. 25, 2005.

FIELD OF THE INVENTION

The present invention relates to an emulation circuit for connection to a low energy lamp energised by an AC supply and substituted for an incandescent lamp in a traffic signal installation.

BACKGROUND OF THE INVENTION

Traffic signals are conventionally designed to operate with incandescent filament lamps. As compared with light emitting diodes cold cathode fluorescent lamps and RF energised fluorescent lamps, i.e. low energy lamps, incandescent lamps draw more current for the same light output and for reasons of energy saving there is considerable interest in replacing existing lamps with such low energy lamps. Another reason for converting to such lamps is that incandescent lamps have a shorter life.

Because filament lamps are not durable, and because failure of a red light at traffic signals can have very serious consequences, the control circuitry used to operate traffic signals conventionally monitors the current drawn by the filament lamps to ensure that the lamps are functioning correctly.

On account of this monitoring of the current drawn by the filament lamps, their replacement with low energy lamps presents a problem because the current drawn by the low energy lamps is not sufficient to indicate to the control circuitry that the lamps are functioning correctly.

A possible solution to this problem would be to modify the control circuitry. While it would be possible to redesign the circuitry of new traffic signals to allow for the fact that low energy lamps are being used in place of filament lamps, it is not economically and commercially viable to modify existing traffic light installations in this manner.

It has previously been proposed to connect a resistance in parallel with the low energy lamps to increase the total current consumption to a level comparable with that of a filament lamp but this clearly is not a sensible solution as it defeats one of the main objects of changing to low energy lamps, namely to improve energy efficiency.

It has further previously been proposed to provide an emulation circuit for connection to a low energy lamp connected in place of a filament lamp in traffic signals, which comprises means for sensing correct operation of the lamp, and means operative when the lamp is sensed to be operating correctly to activate an auxiliary load intermittently to draw an additional current through the auxiliary load from the AC supply only between preset phase angles of the AC supply.

The above known emulation circuit suffers from the disadvantage that it does not allow for the fact that traffic signals are operated with a lower intensity by night than they are by day. This is done because a light sufficiently bright to be seen clearly by day would dazzle road users and create a nuisance by night. The reduction in light intensity is brought about by reducing the supply voltage to the lamps. The reduced voltage results in the filament lamp operating at a lower temperature which will in turn reduce its resistance and affect the current drawn from the current supply.

It is important to match the current drawn by an LED from the current supply to the current of an incandescent lamp accurately because for each aspect (red, amber, green), several lights will be energised at the same time. The controller monitors the total current drawn by all the lamps and from that determines if any of the lamps is not functioning correctly. The effect of summing the currents drawn by several lamps that are energised at the same time is to multiply by the number of lights any error in the drawn current by each lamp. If less current is drawn by each lamp, the controller will respond as if some lamps are inoperative when they are all still working correctly and, conversely, if too much current is drawn then the controller may not detect when a lamp has stopped working.

OBJECT OF THE INVENTION

The present invention seeks therefore to provide an emulation circuit that can accurately match the current drawn by an LED to that of an incandescent lamp when operating under at least two different supply voltages.

SUMMARY OF THE INVENTION

In accordance with the present invention, there is provided an emulation circuit for connection to a low energy lamp to permit the low energy lamp to be substituted for an incandescent lamp in a traffic signal installation which monitors correct lamp operation by sampling the current drawn by the lamp from an AC supply at preset phase angles of the AC supply cycle, the emulation circuit comprising means for sensing the magnitude of the AC supply voltage applied to energise the lamp, means for sensing correct operation of the lamp, and means operative only when the lamp is sensed to be operating correctly to activate an auxiliary load intermittently to draw an additional current through the auxiliary load from the AC supply only between said preset phase angles of at least some power supply cycles of the AC supply, and means for varying the magnitude of the additional current drawn by the auxiliary load in dependence upon the sensed magnitude of the supply voltage.

In the preferred embodiment of the invention, the low energy lamp is an LED lamp connected in place of a filament lamp.

The means for sensing correct operation of the lamp may monitor the current drawn by the lamp in the case of an LED lamp or a cold cathode fluorescent lamp. In the case of an RF energised fluorescent lamp, the RF energy may be monitored. However, because the current and the RF energy may not be a reliable indication of light output, it is possible to provide means to monitor the intensity of the light emitted by the lamp and to indicate correct operation only when the light intensity exceeds a preset threshold.

The emulation circuit takes advantage of the fact that in conventional traffic signals, the operation of a lamp is not monitored continuously but by sampling the current drawn by the lamp at preset phase angles of the AC supply cycle. Because of this, it is not necessary for the auxiliary load to draw a high current continuously and it suffices instead to increase the current drawn from the AC supply by activating the auxiliary load only during the sampling intervals of the monitoring circuit.

By connecting the circuit of the invention to a low energy lamp, one can create a light unit that emulates the current drawn by a filament lamp at the sampling instants that are monitored by the monitoring circuit, thereby allowing the light unit to be substituted for a filament lamp without making any other modifications to the traffic signals installation.

Because the sampling phase angle may vary from one traffic signals installation to another, it is preferable for the emulation circuit to have means for enabling adjustment of the phase angles between which the auxiliary load is activated.

Preferably, both the phase angle at which the auxiliary load is switched on and the phase angle at which the auxiliary load is switched off are adjustable independently to enable both the timing and the duration of the activation window of the auxiliary load to be adjusted to optimise emulation and minimise the current consumption by the auxiliary load.

BRIEF DESCRIPTION OF THE DRAWING

The invention will now be described further, by way of example, with reference to the accompanying drawing, which is a circuit diagram of an emulation circuit of the invention.

DETAILED DESCRIPTION OF THE DRAWING

For ease of explanation, the circuit in the accompanying drawing has been subdivided into functional blocks that are outlined in chain dotted lines. The circuit had been drawn in more detail that is essential for an understanding of the invention and it will be clear to those skilled in the art that the functional blocks may have a different internal construction without affecting the manner in which they perform.

The emulation circuit has two input terminals 10 to which an incandescent lamp would normally be connected. The circuit also has two output terminals 12 for connection to an LED light source. The LED light source does not simply comprise an array of LED's but includes a switch mode power supply which matches the power factor of the LED light source to that of the incandescent lamp which it replaces. As details of the switch mode power supply and the power factor correction are to be found in the prior art, a detailed description of the LED light source need not be given within the present context.

The emulation circuit comprises a full wave a rectifier 14 which includes a fuse F1, a variable resistor R10 and a diode bridge DB. The output of the rectifier 14 is supplied by way of a diode D6 to one of the terminals 12 connected to the LED light source. The rectifier 14 is not required by the light source, the switch mode power supply of which itself includes a rectifier, and its function will be explained below.

The various electronic circuits to be described below require a low voltage DC supply which is provided by means of the circuit 16. The DC supply circuit 16 has an internal design intended to minimise the power drawn from the AC supply while at the same time responding rapidly when the AC supply is first switched on to energise the associated lamp.

At the commencement of each mains cycle, the MOSFET Q1 is switched on by the capacitor C3, the resistors R8 and R9 and the diode D1 for a short length of time to charge the capacitor C12 through the resistor R25. The voltage across the capacitor C12 develops a 5V drop across the zener diode D8 to which it is connected by way of the resistor R23. The 5V supply is smoothed by three capacitors C8, C9 and C11. It will be appreciated that there are numerous other circuits that can be used to provide a stable 5V supply from the incoming mains voltage.

Following the instant when a lamp is first turned on, there will be a short time period when the low voltage DC supply 16 does not provide a sufficiently high output voltage to operate the remaining circuitry. As a result, during this time the emulation circuit will not operate correctly. There are however some transient effects that occur when switching on incandescent lamps and, to allow for this, the controllers of traffic light installations do not monitor the current drawn by the lamps until those currents have reached a steady state. It is therefore believed that the delay in operation of the emulation circuit will have no practical effect on its performance. Of course, should this not prove to be the case, it would be possible to provide an accumulator or a large capacitor to store a charge during those times that the associated lamp is not switched on.

The circuit 18 is connected to one of the supply terminals 10 to provide a single output ZCROSS indicative of zero crossings of the supply voltage. This reference signal is required by the micro controller, drawn within the block 20, to enable it to match the phase of the additional current pulses to be drawn by the auxiliary load as will be described below.

The micro controller 20 is a small computer programmed to perform certain tasks. In particular, it may be a PIC16F819P programmed to produce output signals, as will be described below, at selected ones of its output terminals in response to signals received at its input terminals. The micro controller block 20 also includes a crystal Y2 and two capacitors C5 and C6 which set an internal 4 MHz clock frequency within the micro controller. The emulation circuit also includes a connector block 22 whose function will be self-evident.

The current drawn by the LED light source flows through four resistors R29-R31 connected in parallel with one another and which may for present purposes be considered as a single resistor. The voltage drop across these four resistors is applied by way of an amplifier 24 to one of the inputs of the micro controller 20. The output voltage of the amplifier 24 not only indicates that the LED light source is functioning correctly but its magnitude is indicative of the applied mains voltage. The amplifier 24 is of conventional design and comprises operational amplifier X2A with negative feedback from its output to its inverting input provided by way of a voltage divider consisting of two resistors R39 and R34.

The micro controller 20 includes an A/D converter to convert the analogue output signal of the amplifier 24 into a digital signal and this is used to generate a pulse width modulated signal PWM having a mark to space ratio that varies with the magnitude of the voltage at the output of the amplifier 24.

The circuit designated 26 includes an auxiliary load R27 and R5 which is switched on intermittently by a MOSFET Q2 under the control of the micro controller 20 in the manner now to be described. The auxiliary load is only switched on during predetermined phase angles of the AC supply and the current drawn by the auxiliary load during these times is determined by the mark to space ratio of the pulse width modulated signal PWM generated by the micro controller 20.

Pulses which indicate the timing of when current is to be drawn by the auxiliary load are produced on an output line of the micro controller 20 designated PWEN, their duration and phase in relation to the zero crossing signal ZCROSS both being adjustable under program control. The timing of the pulses PWEN is determined empirically during installation of the emulation circuit. The phase and duration of the PWEN pulses may vary from one traffic light installation to another and their optimum timing can be determined by trial and error.

The pulse width modulated signal is converted within the block 26 back into a steady DC signal by a voltage divider comprising resistors R2 and R38 and an RC smoothing circuit comprising resistor R36 and capacitor C7. Thus, a voltage is applied to one of the inputs of the operational amplifier X2C indicative of the magnitude of the desired additional current while pulses are applied to the second input of the operational amplifier X2C to indicate the times when the auxiliary load is to be switched on. The resulting output voltage of the operational amplifier X2C is compared by the operational amplifier X2D with a reference voltage supplied from the stabilised 5V supply by a voltage divider comprising the resistors R3, R1 and R29-R31. The output of the operational amplifier X2D switches on the MOSFET Q2 to draw an additional current through the resistors R27 and R5 which is regulated to the desired value by the negative feedback through the resistor R1.

The purpose of the diode bridge DB and diode D6 is to allow a positive reading of the current through the lamp, developed as a voltage across the resistors R29 to R32, on both the positive and negative portions of the mains cycle. This allows the circuit 26 to stabilise the auxiliary load current against the positive voltage derived from the PWM signal for both positive and negative mains half cycles.

In this way, a current is drawn by the auxiliary load which coincides with the pulses produced by the micro controller 20 over the control line PWEN and its magnitude is determined by the mark to space ratio of the PWM signal which is also generated by the micro controller 20 and varies with the applied AC voltage as measured by the amplifier 24.

An additional function served by the stabilised auxiliary load is that it compensates for irregularities in the current drawn by the lamp. The switch mode power supply employed in the light source may have ripples and other perturbations sufficient to frustrate the lamp counting function of the traffic controller system. If one were to effect the desired emulation by simply switching in an additional resistor, the resultant current drawn would be the sum of the resistor current and the lamp current. When the lamp current is perturbed with, for example, a high frequency current ripple, then the resultant total current will have the same ripple impressed upon it. Because the preferred embodiment of the invention stabilises the sum of the currents against the reference provided by the PWM signal, such a current ripple will be suppressed during the times that the lamp current is being monitored by the controller of the traffic signals installation.

Because the micro controller 20 is programmable, it is possible to set the switching on and switching off times of the auxiliary load at will, to coincide with the times that the current drawn by the lamp is monitored by the controller of the traffic light installation. Furthermore, it is possible to calibrate the micro controller 20, for example by the use of a lookup table, so that the additional current drawn by the auxiliary load always accurately reflects the current that would be drawn by the equivalent incandescent lamp when operated at the same voltage.

The PWEN pulses may be generated during both positive and negative half cycles of the mains supply or during the only one of these two. If within the controller of the traffic light installation the current drawn is not sampled during each and every main cycle then the auxiliary load one need only draw additional current during those cycles of the mains supply that are monitored by the controller.

Though it is convenient to use output of the amplifier 24 both to indicate that the LED light source is operating correctly and to provide a measure of the applied mains voltage, it would be alternatively possible to make a separate measurement of the mains supply voltage. Furthermore, the correct operation of the light source can be determine by monitoring its light output rather than by sensing the current drawn from the mains supply.

Though the illustrated circuit employs a programmed micro controller for convenience, it will be appreciated that the functions that it performs can all be carried using other digital and/or analogue circuitry. In principle, the micro-controller is required to output only two signals, one (PWM) indicating the magnitude of additional current required to match the current that would be drawn by an incandescent lamp and the other (PWEN) for switching this additional current on and off at the instants when the current drawn by the lamp is being monitored by the controlled of the traffic light installation.

It can be seen from the above that the present invention provides an emulation circuit that allows a low energy light source to be substituted for an incandescent lamp without making any other modifications to the traffic light installation. Furthermore, the circuit ensures that correct and accurate emulation is achieved even when the applied voltage is varied to modify the intensity of the light to suit the ambient light conditions.

The invention claimed is:

1. An emulation circuit for connection to a low energy lamp to permit the low energy lamp to be substituted for an incandescent lamp in a traffic signal installation which monitors correct lamp operation by sampling the current drawn by the lamp from an AC supply at preset phase angles of the AC supply cycle, the emulation circuit comprising:
    means for sensing the magnitude of the AC supply voltage applied to energise the lamp,
    means for sensing correct operation of the lamp,
    means operative only when the lamp is sensed to be operating correctly to activate an auxiliary load (R27, R5) intermittently to draw an additional current through the auxiliary load from the AC supply (10) only between said preset phase angles of at least some power supply cycles of the AC supply, and
    means for varying the magnitude of the additional current drawn by the auxiliary load in dependence upon the sensed magnitude of the supply voltage.

2. An emulation circuit as claimed in claim 1, wherein the low energy lamp is an LED light source.

3. An emulation circuit as claimed in claim 2, wherein the LED source includes a power factor correcting circuit.

4. An emulation circuit as claimed in claim 1, wherein the means for sensing correct operation of the lamp includes means responsive to the current drawn by the lamp.

5. An emulation circuit as claimed in claim 1, wherein the means for sensing correct operation of the lamp includes means responsive to the light output of the lamp.

6. An emulation circuit as claimed in claim 1, wherein means are provided for enabling adjustment of the phase angles between which the auxiliary load is activated.

7. An emulation circuit as claimed in claim 6, wherein the phase angle at which the auxiliary load is switched on and the phase angle at which the auxiliary load is switched off are adjustable independently of one another.

8. An emulation circuit as claimed in claim 1, incorporating a DC supply circuit for powering the emulation circuit which draws its power from the mains supply to the low energy lamp whereby the emulation circuit does not operate at times when the low energy lamp is not operating.

* * * * *